United States Patent [19]
Richt

[11] 3,829,749
[45] Aug. 13, 1974

[54] DIRECT-CURRENT MOTOR WITH PERMANENT-MAGNET ROTOR AND SEQUENTIALLY ENERGIZED STATOR WINDINGS

[75] Inventor: Hubert Richt, Soecking, Germany

[73] Assignee: Siemens Aktiengesellschaft, Munich, Germany

[22] Filed: Mar. 15, 1973

[21] Appl. No.: 341,672

[30] Foreign Application Priority Data
Mar. 15, 1972 Germany .......................2212497

[52] U.S. Cl. ............................... 318/331, 318/138
[51] Int. Cl. ............................................. H02p 5/16
[58] Field of Search..................... 318/138, 254, 331

[56] References Cited
UNITED STATES PATENTS
| | | | |
|---|---|---|---|
| 3,611,081 | 10/1971 | Watson | 318/138 |
| 3,688,172 | 8/1972 | Sieber | 318/138 |
| 3,706,021 | 12/1972 | Yanagida | 318/331 |

Primary Examiner—Robert K. Schaefer
Assistant Examiner—Thomas Langer
Attorney, Agent, or Firm—Kenyon & Kenyon Reilly Carr & Chapin

[57] ABSTRACT

An electric motor circuit is disclosed and includes a direct-current motor having star-connected stator windings and a permanent magnet rotor. A sequential switching circuit connect each of the stator windings in sequential relation with a direct current supply during intermittent active intervals of time. A voltage-responsive circuit is connected to the stator windings for responding to voltages induced in each of the windings between the active intervals by the rotor. The voltage responsive circuit includes transistors each of which is connected at its emitter to the end of a corresponding one of the stator windings remote from the star point. The respective bases of the transistors are connected to the star point of the stator windings and the respective collectors to a common line so that through the collectors, the half-waves of the induced voltages of a polarity opposite to that of the supply voltage are decoupled from the stator windings.

2 Claims, 1 Drawing Figure

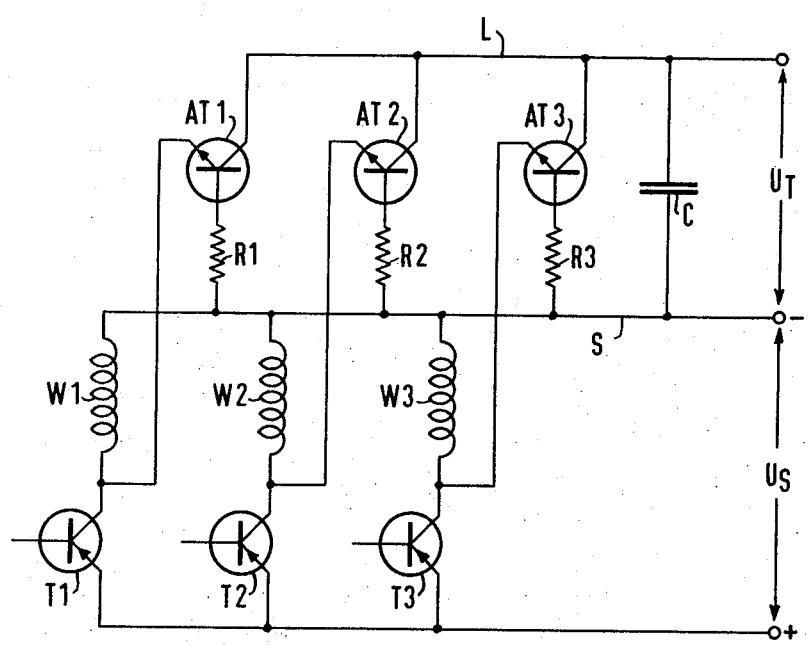

DIRECT-CURRENT MOTOR WITH PERMANENT-MAGNET ROTOR AND SEQUENTIALLY ENERGIZED STATOR WINDINGS

My invention relates to electric motor circuits comprising a direct-current motor, having a permanent-magnet rotor and stator windings which are sequentially energized by direct current to produce a rotating field.

In electric drive systems, particularly those operating at controllable or regulatable speed, it is often necessary to precisely ascertain at any moment the instantaneous motor speed. Various methods and devices have become known for performing continuous speed measuring operations. A known way is to connect diodes, by the one pole, to the stator windings in the blocking direction to the supply voltage, which, through the other pole, the half waves of the induced voltages of a polarity opposite to that of the supply voltage are decoupled from the stator winding.

Disadvantages of the known arrangement consist in that the forward voltage of the diodes and the considerable tolerances of the forward voltage (approx. 0,3 .. .. 0,7 volts) and of the forward resistance of the diodes effect reduction of the induced voltage.

It is an object of my invention to provide a motor circuit in which the influence of the forward voltage on the induced voltage is reduced.

It is a further object of my invention to reduce the influence caused by the considerable tolerances of the forward voltage and of the forward resistance of the diodes.

For a better understanding of the invention reference is made to the accompanying drawing, in which: Three star-connected stator windings W1, W2, W3 of a direct-current motor are shown.

The supply voltage $U_S$ is applied to the stator winding, the negative pole of the voltage source being connected to the star point S of the stator windings. Electronic switches T1, T2, T3 are connected between the positive pole of the voltage source and the individual stator windings W1, W2, W3. These switches act as a commutating device, energizing the individual stator windings W1, W2, W3 in sequence so that a rotating field is produced in the motor.

The emitters of transistors AT1, AT2, AT3 are connected to the ends, remote from the star point, of the stator windings. The base of the transistors is connected to the star point of the stator windings W1, W2, W3, each through a protective resistor. The collectors of the said transistors AT1, AT2, AT3 are connected to a common line L.

The transistors AT1, AT2, AT3 are poled in such a manner that, through the collectors of these transistors, the half waves of the induced voltages of a polarity opposite to that of the supply voltage are decoupled from the stator windings.

By this, a voltage $U_T$ proportional to the motor speed is available between the star point S of the stator winding and the common line L, this voltage $U_T$ being used to control the motor speed. The decoupled voltages can be smoothed by means of a capacitor C.

I claim:

1. An electric motor circuit, comprising a direct-current motor having permanent-magnet rotor and stator windings connected in a star configuration, direct-current supply means, sequential switching means connecting each of said stator windings in sequential relation with said supply means during intermittent active intervals of time, voltage-responsive circuit means connected to said stator windings for response to voltages induced in each of said windings between said active intervals by said rotor, said voltage-responsive circuit means including transistors, each connected, by its emitter, to the ends, remote from the star point, of the stator windings, and, by its base, to the star point of the stator windings, and, by its collector, to a common line so that, through the collectors, the half waves of the induced voltages of a polarity opposite to that of the supply voltage are decoupled from the stator winding.

2. An electric motor circuit as claimed in claim 1, wherein the base of the transistors is connected to the star point of the stator windings each through a protective resistor.

* * * * *